United States Patent
Zeng

(10) Patent No.: US 11,409,646 B2
(45) Date of Patent: Aug. 9, 2022

(54) METHOD FOR RELEASING MEMORY

(71) Applicant: AMLOGIC (SHANGHAI) CO., LTD., Shanghai (CN)

(72) Inventor: Tao Zeng, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 387 days.

(21) Appl. No.: 16/324,028

(22) PCT Filed: Sep. 27, 2018

(86) PCT No.: PCT/CN2018/108099
§ 371 (c)(1),
(2) Date: Feb. 7, 2019

(87) PCT Pub. No.: WO2019/072093
PCT Pub. Date: Apr. 18, 2019

(65) Prior Publication Data
US 2021/0349817 A1 Nov. 11, 2021

(30) Foreign Application Priority Data

Oct. 11, 2017 (CN) .......................... 201710943306.4

(51) Int. Cl.
*G06F 12/02* (2006.01)

(52) U.S. Cl.
CPC ........ *G06F 12/023* (2013.01); *G06F 12/0223* (2013.01); *G06F 12/0238* (2013.01); *G06F 2212/1044* (2013.01)

(58) Field of Classification Search
CPC ............. G06F 12/0238; G06F 12/0246; G06F 12/0253; G06F 12/0261; G06F 12/023
See application file for complete search history.

(56) References Cited

U.S. PATENT DOCUMENTS

| 2015/0286564 A1* | 10/2015 | Lim ..................... G06F 12/123 711/159 |
| 2016/0275009 A1 | 9/2016 | Kim |

FOREIGN PATENT DOCUMENTS

| CN | 101221536 A | 7/2008 |
| CN | 102053916 A | 5/2011 |
| CN | 106294198 A | 1/2017 |

\* cited by examiner

*Primary Examiner* — Reginald G Bragdon
*Assistant Examiner* — Thanh D Vo
(74) *Attorney, Agent, or Firm* — Calfee Halter & Griswold LLP

(57) ABSTRACT

A method for releasing memory allocated by a contiguous memory allocator that merges a to-be-released memory page with an adjacent free page to form a memory block that can be released more efficiently than would be the case when releasing a series of un-merged memory pages.

4 Claims, 2 Drawing Sheets

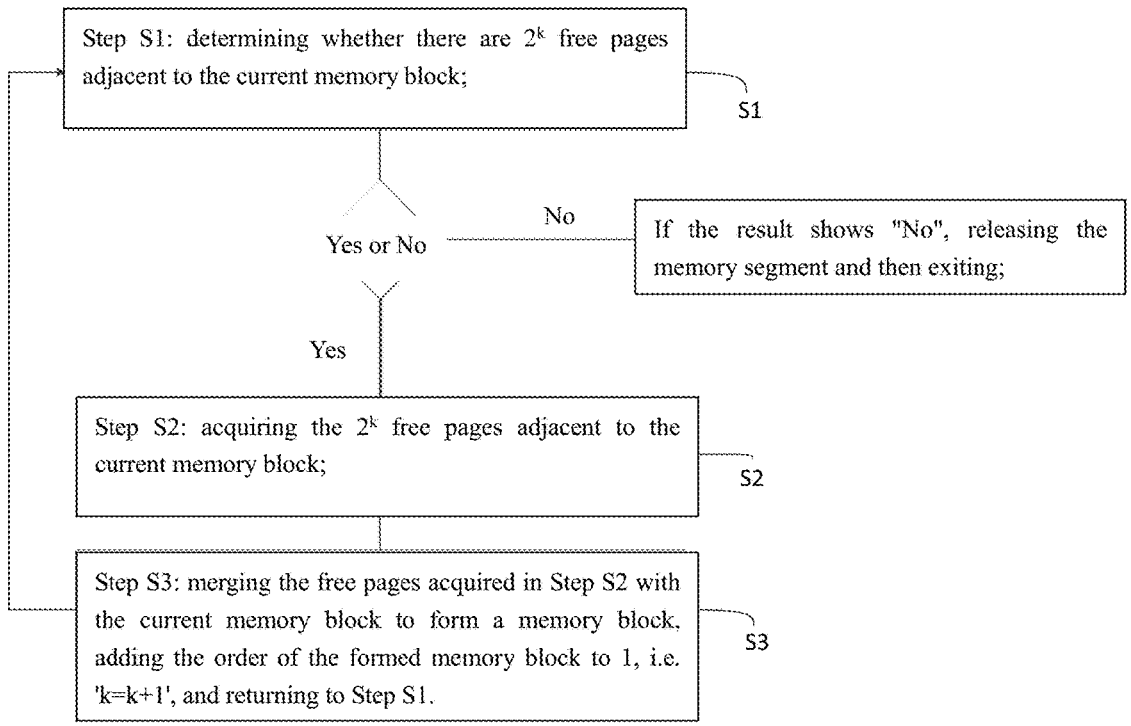
FIG. 1
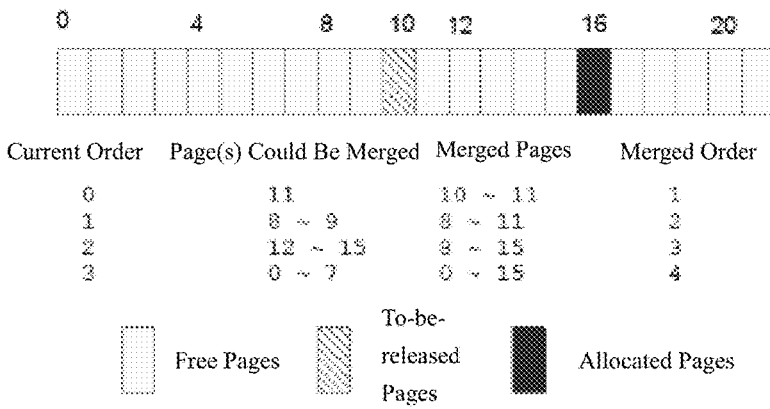
PRIOR ART        FIG. 2

METHOD FOR RELEASING MEMORY

CROSS-REFERENCE TO RELATED APPLICATIONS

This application is a national phase of Serial Number: PCT/CN2018/108099 filed Sep. 27, 2018, the entire contents of which is incorporated herein by reference, and which claims the benefit of and priority to Chinese Patent Application No. 201710943306.4 filed Oct. 11, 2017.

FIELD OF THE INVENTION

The invention belongs to the field of communication technology, more specifically, to a method for releasing memory.

BACKGROUND OF THE INVENTION

With the development of audio coding technology, a large amount of physically contiguous memory needs to be provided to a coding driver on an embedded platform. The existing way to solve this problem is to allocate the memory to the coding driver via a Contiguous Memory Allocator (CMA). When the coding driver stops using the allocated memory, the CMA incorporates the memory into the management of a partner system through a specially marked migration type, then the allocated memory can be used as a backup memory for applications when the application data is insufficient. When the driver needs to use the CMA memory, it can sort out a continuous memory segment by the recovery and migration mechanism. Using the CMA, the requirements of memory are well balanced between the application and the driver, so that the CMA has been widely used. In the case that the driver stops using the memory allocated by the CMA and when the allocated memory is released, the existing releasing method is that the free pages are released one by one. However, this releasing method is inefficient and time-consuming if there is a large amount of memory which needs to be released.

SUMMARY OF THE INVENTION

In order to overcome the defects of releasing the memory segment in the prior art, the present invention provides a method for releasing memory by CMA, which can improve the speed and efficiency of releasing memory.

In order to achieve the above purposes, exemplary embodiments adopt the following technical solutions.

In an exemplary embodiment, a method for releasing memory, is applied to release the memory allocated by a contiguous memory allocator (CMA), wherein a memory segment that needs to be released is provided by the CMA, the memory segment comprises a plurality of free pages, one of the plurality of free pages is acquired and defined as a to-be-released page, and the to-be-released page is merged with the free page adjacent to the to-be-released page to form a current memory block, an order 'k=1' of the current memory block is obtained, and the current order is output to the CMA;

Such an exemplary method comprises the steps of:

Step S1: determining whether there are $2^k$ free pages adjacent to the current memory block;

if it is determined that there are $2^k$ free pages, turning to step S2;

if it is determined that there are not $2^k$ free pages, releasing the memory segment and then exiting;

Step S2: acquiring the $2^k$ free pages adjacent to the current memory block;

Step S3: merging the free pages acquired in Step S2 with the current memory block to form a memory block, adding the order of the formed memory block to 1, i.e. 'k=k+1', and returning to Step S1.

In an exemplary embodiment, the CMA provides a release module through which a few of the plurality of free pages whose number is corresponding to the order of the memory block are acquired.

In an exemplary embodiment, the exemplary method provides a partner system, by which the memory block composed of the few of the plurality of free pages and the to-be-released page is released, or by which the memory block composed of the few of the plurality of free pages is released.

In an exemplary embodiment, the memory segment that needs to be released is a memory segment with a continuous physical address.

In an exemplary embodiment, each of the plurality of free pages has a size of about 4 kilobytes.

In an exemplary embodiment, the order of data blocks composed of each of the plurality of free pages is 0, and the order is corresponding to the number of the plurality of free pages.

The foregoing technical solution in the present invention has the following advantages or beneficial effects: releasing $2^k$ free pages at a time, thereby greatly improving the speed and efficiency of the CMA memory release, and overcoming the defects of known method of releasing referred to as one-by-one releasing. This is desirable when because performing a one-by-one release when the capacity of the memory is large may result in a release process that takes a long time, and the efficiency of the release is very low.

BRIEF DESCRIPTION OF THE DRAWINGS

The accompanying drawings, together with the specification, illustrate exemplary embodiments of the present disclosure, and, together with the description, serve to explain the principles of the present invention.

FIG. 1 is a flowchart of an exemplary embodiment of a method for releasing memory according to the present invention;

FIG. 2 is a structural schematic view of a method for releasing memory in the prior art;

DETAILED DESCRIPTION

Figure 3:
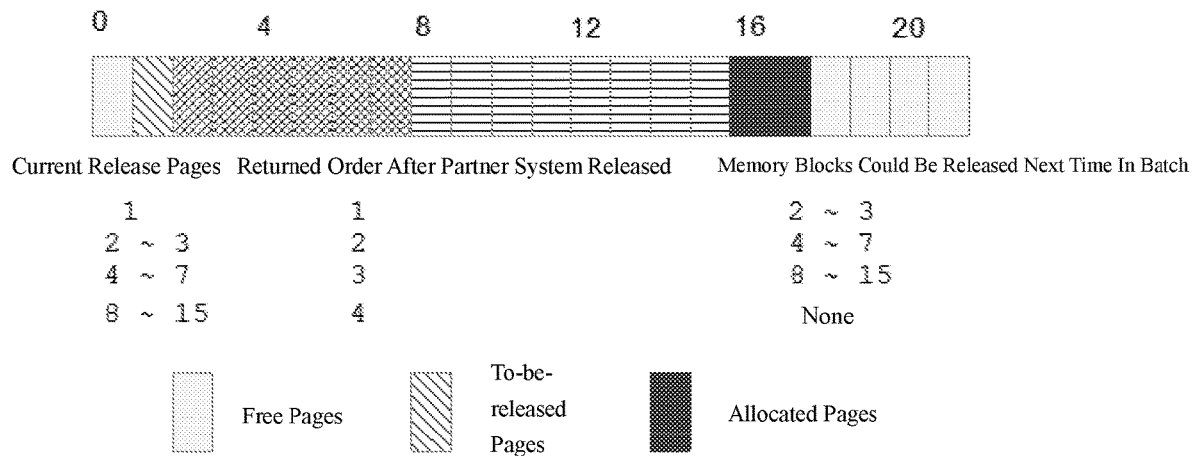
FIG. 3 is a structural schematic view of releasing a memory segment in an exemplary embodiment of a method for releasing memory according to the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, the exemplary embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

An embodiment of a method or system for releasing memory, which is applied for releasing the memory allocated by a contiguous memory allocator (CMA), wherein a memory segment that needs to be released is provided by the CMA, the memory segment comprises a plurality of free pages, one of the plurality of free pages is acquired and defined as a to-be-released page, and the to-be-released page is merged with the free page adjacent to the to-be-released page to form a memory block, an order 'k=1' of the current memory block is obtained, and the current order is output to the CMA.

As illustrated in the flowchart of FIG. 1, an Exemplary method comprises the steps of:

Step S1, determining whether there are $2^k$ free pages adjacent to the current memory block;

if it is determined that there are $2^k$ free pages, turning to step S2;

if it is determined that there are not $2^k$ free pages, releasing the memory segment and then exiting;

Step S2, acquiring the $2^k$ free pages adjacent to the current memory block;

Step S3, merging the free pages acquired in Step S2 with the current memory block to form a memory block, adding the order of the formed memory block to 1, i.e. 'k=k+1', and returning to Step S1.

The method for releasing memory by a CMA in the prior art, is illustrated referring to releasing the memory segment as shown in FIG. 2.

As shown, when a single page of the number 10 needs to be released, it can be merged with the following page of the number 11 to generate a contiguous memory block with an order (order of memory blocks) 1 (i.e. $2^1$).

The above steps are repeated such that the contiguous memory block composed of pages of numbers 10 and 11 can be merged with the free pages of numbers 8 and 9 to generate another contiguous memory block with an order 2 ranging from the pages of numbers 8 to 11.

The above steps are repeated until a contiguous memory block with an order of 4 ranging from the pages of numbers 0 to 15 is finally generated. Since the $16^{th}$ free page has already been allocated, it is impossible to continue the re-merging, so the release process is terminated.

The above-mentioned release method used in the prior art is to release the memory one-by-one according to the number of the free pages, so when releasing each time, the partner system will do the merging from order '0'. As a result, the release efficiency is very low, especially when the amount of memory that needs to be released is large. The result is that in known methods the time required for release of memory will be long.

In an exemplary embodiment, an order of the memory block formed by merging free pages is obtained each time. The number of free pages to be released next time is obtained according to the order, and so on, until the release of the memory segment is completed.

In an exemplary embodiment, the CMA provides a release module through which a few of the plurality of free pages whose number is corresponding to the order of the memory block are acquired.

In the above exemplary embodiment, in order to maintain a plurality of free pages, a few of plurality of free pages are formed into memory blocks. Each of the memory blocks has a power of 2 pages. An exponent of the power is called an order, and the partner system releases a portion of the plurality of free pages based on the power of 2.

In an exemplary embodiment, a partner system is provided which releases the memory block composed of the few of the plurality of free pages and the to-be-released pages, or alternatively, by which the memory block composed of the portion of the plurality of free pages is released.

In the above exemplary embodiment, the partner system refers to two sub-entities with consistent attributes which are split by one parent entity, and the two sub-entities are in a partnership. For example, in the process of memory allocation by an operating system, a memory block is often split into two equal-sized memory blocks, and the two equal-sized memory blocks are configured into a partnership arrangement.

In an exemplary embodiment, the memory segment that needs to be released is a memory segment with a continuous physical address.

In an exemplary embodiment, each of the plurality of free pages has a size of 4 kilobyte.

In an exemplary embodiment, the order of data blocks composed of each of the plurality of free pages is 0.

An exemplary embodiment is described as follows. As shown in FIG. 3, a memory segment is provided. The memory segment includes 0-15 free pages, and the free page of number 1 is defined as a to-be-released page. The exemplary releasing method comprises the steps of:

First, starting from a free page of number 1, the free page of number 1 and a free page of number 0 are merged together into a contiguous memory block with an order of 1, and the partner system returns the order of 1.

Since the first two free pages are continuous and already constitute a partner system, free pages numbered 2 and 3 can be submitted to the partner system together at the next time of release, and the free pages released and the merged pages have a same order. A consecutive memory block with order 2 can be merged by the partner system in one operation and the partner system returns order 2 to the release module.

Similarly, during the third release, the consecutive free pages numbered 4 to 7 can be released at one time, and the memory block merged with the partner system having free pages numbered 0 to 3 is merged into a memory block with an order of 3, thereby having free pages numbered 0 to 7.

During the third time of release, the free pages of number 8 to 15 can be released at one time, and the partner system can merge into a contiguous memory block with an order 4, having free pages of number 0 to 15.

So far, in the exemplary embodiment, the release of all 15 free pages is completed using only 4 times of operation, while in the prior art, 15 times of operations are required to complete the memory release.

Therefore, the method of the invention can greatly improve the efficiency of memory release, and the more pages of memory that are released, the more improvement is achieved.

Figure 4:
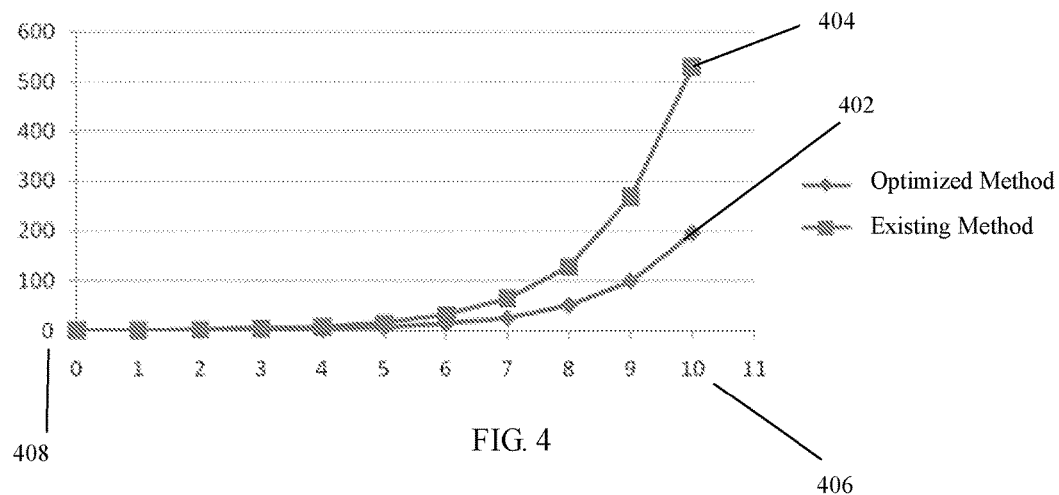
FIG. 4 is a comparison chart of the releasing method in an embodiment of the present invention to the existing releasing method.

FIG. 4 shows a comparison of the optimized releasing method in the present invention 402 and known methods 404 art as follows:

The horizontal axis 406 is the number of CMA memory pages released in a single time, the number is calculated as a power of 2, and '10' represents releasing $2^{10}$ pages in a single time, that is, there are 1024 memory pages regarded as free pages.

The vertical axis 408 is the time it takes to complete the releasing within a plurality of microseconds (μs).

It can be seen from the comparison in FIG. 4 that in the exemplary embodiment, compared with the known methods, when the number of memory pages released in a single time is larger, the order is larger, and the time consumed by the exemplary embodiment is lower. When the order is 10, the time for a single releasing is less than 200 μs, but the releasing time in the previous solution is about 530 μs. Therefore, the new solution takes only 37% of the time of known methods.

The above descriptions are only exemplary embodiments of the invention, should not be interpreted to limit the embodiments and scope of the invention to only those exemplary embodiments. Those skilled in the art should be able to realize that the schemes obtained from the content of specification and drawings of the invention are within the scope of the invention.

What is claimed is:

1. A system for releasing memory comprising:
   a memory segment comprising a plurality of free pages wherein one of the plurality of free pages is identified as a to-be-released page;
   a partner system merging the to-be-released page with a free page adjacent to the to-be-released a page to form a current memory lock;
   a contiguous memory allocator (CMA) receiving a current value of 'k=1' of the current memory block; and
   a release module, provided by the CMA, to perform releasing steps of:
   outputting the current value of k to the CMA;
   determining whether there are $2^k$ free pages adjacent to the current memory block;
   releasing the memory segment and then exiting the releasing steps if it is determined that there are not $2^k$ free pages adjacent to the current memory block; and
   if there are $2^k$ free pages adjacent to the current memory block then performing merging steps of:
   acquiring the $2^k$ free pages adjacent to the current memory block;
   merging the acquired $2^k$ free pages with the current memory block to form a memory block;
   increment the current value of k of the formed memory block by 1, where 'k=k+1'; and
   the release module returning to perform the releasing steps again.

2. The system for releasing memory according to claim 1, wherein the partner system releases the memory block from:
   the memory block composed of a few of the plurality of free pages and the to-be-released page; or the memory block composed of a few of the plurality of free pages.

3. The system for releasing memory according to claim 1, wherein the memory segment that needs to be released is a memory segment with a continuous physical address.

4. The system for releasing memory according to claim 1, wherein each of the plurality of free pages has a size of 4 Kb.

\* \* \* \* \*